(12) United States Patent
Yang et al.

(10) Patent No.: US 8,049,448 B2
(45) Date of Patent: Nov. 1, 2011

(54) CONTROL CIRCUIT WITH DUAL PROGRAMMABLE FEEDBACK LOOPS FOR BLDC MOTORS

(75) Inventors: Ta-Yung Yang, Milpitas, CA (US); Yi-Min Hsu, Taichung (TW); Pei-Sheng Tsu, Taipei County (TW); Chung-Hui Yeh, Taipei County (TW); Shih-Jen Yang, Taipei County (TW)

(73) Assignee: System General Corporation, Sindian, Taipei County (TW)

( * ) Notice: Subject to any disclaimer, the term of this patent is extended or adjusted under 35 U.S.C. 154(b) by 412 days.

(21) Appl. No.: 12/465,866

(22) Filed: May 14, 2009

(65) Prior Publication Data
US 2009/0309526 A1 Dec. 17, 2009

Related U.S. Application Data

(60) Provisional application No. 61/131,904, filed on Jun. 13, 2008.

(51) Int. Cl.
*H02P 6/08* (2006.01)
(52) U.S. Cl. .......... 318/400.07; 318/400.03; 318/400.05

(58) Field of Classification Search ............ 318/400.01–400.07, 700, 701, 318/720–724
See application file for complete search history.

(56) References Cited

U.S. PATENT DOCUMENTS

| | | | | | |
|---|---|---|---|---|---|
| 4,429,262 | A | * | 1/1984 | Utenick | 318/400.12 |
| 4,544,868 | A | * | 10/1985 | Murty | 318/400.11 |
| 4,591,774 | A | * | 5/1986 | Ferris et al. | 318/696 |
| 4,686,437 | A | * | 8/1987 | Langley et al. | 318/400.01 |
| 5,210,474 | A | * | 5/1993 | Oswald | 318/400.13 |

* cited by examiner

*Primary Examiner* — Bentsu Ro
(74) *Attorney, Agent, or Firm* — Thomas|Kayden

(57) ABSTRACT

A BLDC (brushless direct current) motor system of the present invention includes a control circuit, a sequencer, a driving circuit, and a BLDC motor. The control circuit comprises a speed-feedback loop and a torque-feedback loop to control the maximum speed and the maximum torque of the BLDC motor in parallel configuration. The speed-feedback loop generates a speed-control signal. The torque-feedback loop generates a torque-control signal. A PWM circuit receives the speed-control signal and the torque-control signal to generate a PWM signal. A pulse width of the PWM signal is correlated to the level of the speed-control signal and/or the level of the torque-control signal.

18 Claims, 4 Drawing Sheets

| HA | HB | HC | HX | HY | HZ | LX | LY | LZ | SA | SB | SC |
|---|---|---|---|---|---|---|---|---|---|---|---|
| 1 | 0 | 1 | $S_{PWM}$ | 0 | 0 | $/S_{PWM}$ | 0 | 1 | 0 | 0 | 1 |
| 1 | 0 | 0 | 0 | $S_{PWM}$ | 0 | 0 | $/S_{PWM}$ | 1 | 0 | 0 | 1 |
| 1 | 1 | 0 | 0 | $S_{PWM}$ | 0 | 1 | $/S_{PWM}$ | 0 | 1 | 0 | 0 |
| 0 | 1 | 0 | 0 | 0 | $S_{PWM}$ | 1 | 0 | $/S_{PWM}$ | 1 | 0 | 0 |
| 0 | 1 | 1 | 0 | 0 | $S_{PWM}$ | 0 | 1 | $/S_{PWM}$ | 0 | 1 | 0 |
| 0 | 0 | 1 | $S_{PWM}$ | 0 | 0 | $/S_{PWM}$ | 1 | 0 | 0 | 1 | 0 |

CONTROL CIRCUIT WITH DUAL PROGRAMMABLE FEEDBACK LOOPS FOR BLDC MOTORS

CROSS REFERENCE TO RELATED APPLICATIONS

The present application claims the benefit of U.S. provisional application entitled "Control Circuit with Dual Programmable Feedback Loops for BLDC Motors", Ser. No. 61/131,904, filed Jun. 13, 2008.

BACKGROUND OF THE INVENTION

1. Field of the Invention

The present invention relates generally to a BLDC (brushless direct current) motors, and more particularly, to a control circuit for BLDC motors.

2. Description of the Related Art

BLDC motors are nowadays gaining popularity in automotive, consumer, and industrial applications. They have many advantages over traditional brushed DC motors, such as higher efficiency, linear speed and torque characteristics, low acoustic noise generation, wider speed range, less maintenance, and longer operating life.

Unlike brushed DC motors being commutated by brushes, BLDC motors are electronically commutated. They are mostly controlled in three-phase configuration. Three hall sensors are embedded into the stator to detect the current rotor position and to determine which two windings will be next energized. The sequence of energizing the windings of the BLDC motors is also known as six-step commutation.

To control BLDC motors, DSP (digital signal processor) is a mostly chosen solution owing to its quick processing capability of measuring or filtering the analog signals. However, its complexity always dominates the main cost of the BLDC motor system.

Speed and torque are two key parameters for controlling a BLDC motor. In conventional arts, an inner torque control loop and an outer speed control loop are cascaded configured. The disadvantage of these arts is they are specifically designed for specified application. They fail to meet other requirements without design changes. Therefore, a BLDC control circuit with low cost and high design flexibility for wide applications is demanded by the industries.

SUMMARY OF THE INVENTION

A BLDC (brushless direct current) motor system of the present invention comprises a control circuit, a sequencer, a driving circuit, and a BLDC motor. The control circuit comprises a speed-feedback loop and a torque-feedback loop to control the maximum speed and the maximum torque of the BLDC motor in parallel configuration.

The speed-feedback loop receives a plurality of speed-output signals and generates a speed-control signal. The speed-output signals are generated by detecting the rotor position of the BLDC motor. The speed-control signal is generated by amplifying an error between a speed-feedback signal and a speed-reference signal. The speed-feedback signal is generated in response to speed-output signals of the BLDC motor. The speed-reference signal is generated in response to data provided by an interface which can be a parallel data bus or a serial data bus.

The torque-feedback loop receives a plurality of switching-current signals and generates a torque-control signal. The torque-control signal is generated by amplifying an error between a torque-feedback signal and a torque-reference signal. The torque-feedback signal is generated in response to a plurality of switching-current signals which are correlated to switching currents of the BLDC motor. The torque-reference signal is generated in response to data provided by the interface which can be a parallel data bus or a serial data bus.

A PWM circuit receives the speed-control signal and the torque-control signal to generate a PWM signal. A pulse width of the PWM signal is correlated to the level of the speed-control signal and/or the level of the torque-control signal. The sequencer receives the PWM signal to modulate the pulse width of a plurality of switching signals output by the sequencer. The switching signals are further coupled to drive the BLDC motor via the driving circuit. According to the arrangement of six-step commutation, the BLDC motor can therefore run smoothly.

It is an objective of the present invention to provide a low cost BLDC control circuit.

It is also another objective of the present invention to provide a BLDC control circuit with high design flexibility for wide applications.

It is also another objective of the present invention to provide an interface to program the maximum speed and the maximum torque of the BLDC motor.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 1 schematically shows a BLDC (brushless direct current) motor system according to the present invention;

DETAILED DESCRIPTION OF THE INVENTION

Figure 2:
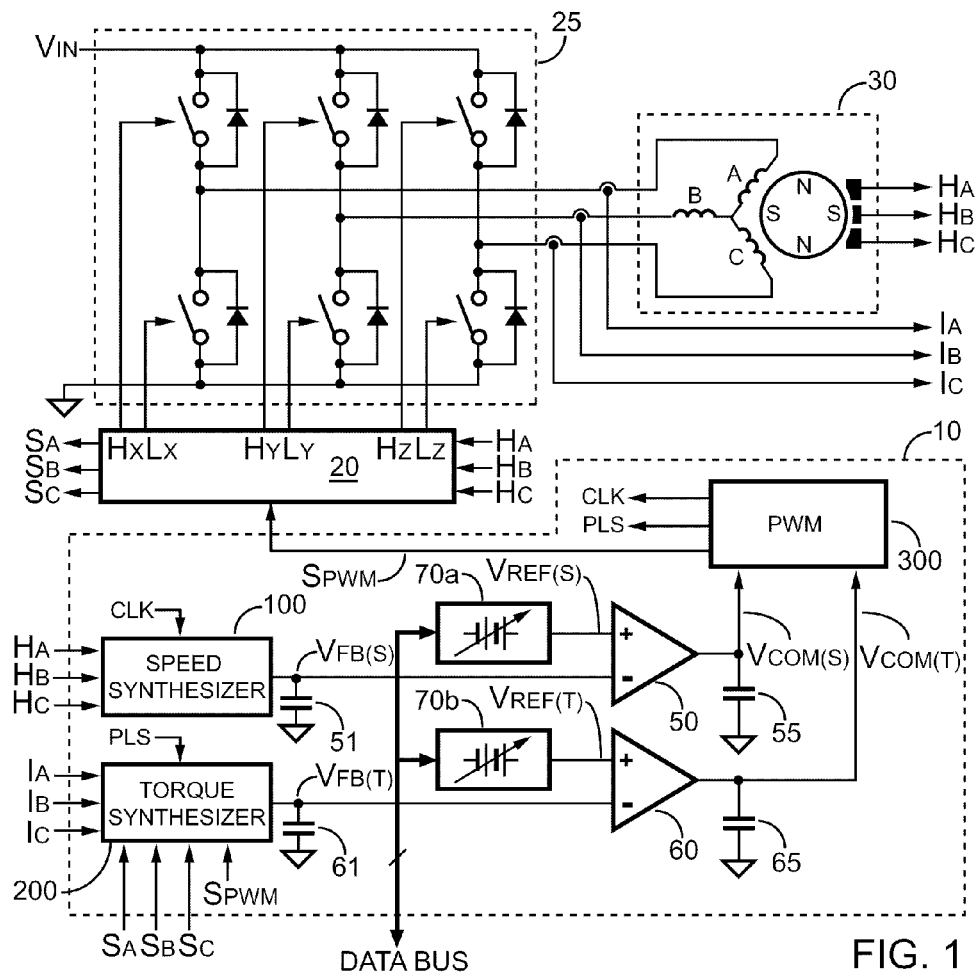
FIG. 2 shows an embodiment of a six-step-commutation truth table according to the present invention.

The following description is of the best-contemplated mode of carrying out the invention. This description is made for the purpose of illustrating the general principles of the invention and should not be taken in a limiting sense. The scope of the invention is best determined by reference to the appended claims.

FIG. 1 schematically shows a BLDC (brushless direct current) motor system according to the present invention. The BLDC motor system comprises a control circuit 10, a sequencer 20, a driving circuit 25, and a BLDC motor 30. A plurality of switching-current signals $I_A$, $I_B$, and $I_C$ are respectively sensed from the driving circuit 25 in each phase and are correlated to switching currents of the BLDC motor 30. Speed-output signals $H_A$, $H_B$, and $H_C$ are generated by detecting the rotor position of the BLDC motor 30. The control circuit 10 receives the speed-output signals $H_A$, $H_B$, and $H_C$ and the switching-current signals $I_A$, $I_B$, and $I_C$ to generate a PWM signal $S_{PWM}$. The sequencer 20 receives the PWM signal $S_{PWM}$ to modulate the pulse width of switching signals $H_X$, $L_X$, $H_Y$, $L_Y$, $H_Z$, and $L_Z$ output by the sequencer 20 and generate sampling signals $S_A$, $S_B$, and $S_C$. The switching signals $H_X$, $L_X$, $H_Y$, $L_Y$, $H_Z$, and $L_Z$ are further coupled to drive the BLDC motor 30 via the driving circuit 25. According to the arrangement of the known six-step commutation, the BLDC motor 30 can therefore run smoothly.

As shown in FIG. 1, the control circuit 10 comprises a speed-feedback loop and a torque-feedback loop to control the maximum speed and the maximum torque of the BLDC motor 30 in parallel configuration. The speed-feedback loop comprises a speed synthesizer 100, a first programmable signal generator 70a, and a first error amplifier 50. The speed synthesizer 100 is coupled to the BLDC motor 30 for generating a speed-feedback signal $V_{FB(S)}$ in response to the speed-output signals $H_A$, $H_B$ and $H_C$, which are generated by hall sensors embedded into the stator of the BLDC motor 30. The first programmable signal generator 70a generates a speed-reference signal $V_{REF(S)}$ in response to data provided by an interface DATA BUS which can be a parallel data bus or a serial data bus. The first error amplifier 50 amplifies an error between the speed-feedback signal $V_{FB(S)}$ and the speed-reference signal $V_{REF(S)}$ to generate a speed-control signal $V_{COM(S)}$. The speed-feedback loop further comprises a first filter capacitor 51 and a first compensation capacitor 55. The first filter capacitor 51 is coupled to an output of the speed synthesizer 100 to filter noise on the speed-feedback signal $V_{FB(S)}$. The first compensation capacitor 55 is coupled to an output terminal of the first error amplifier 50 to provide frequency compensation for the speed-feedback loop.

The torque-feedback loop comprises a torque synthesizer 200, a second programmable signal generator 70b, and a second error amplifier 60. The torque synthesizer 200 is coupled to the BLDC motor 30 for generating a torque-feedback signal $V_{FB(T)}$ in response to the switching-current signals $I_A$, $I_B$ and $I_C$ sensed from the driving circuit 25. The second programmable signal generator 70b generates a torque-reference signal $V_{REF(T)}$ in response to data provided by the interface DATA BUS which can be a parallel data bus or a serial data bus. The second error amplifier 60 amplifies an error between the torque-feedback signal $V_{FB(T)}$ and the torque-reference signal $V_{REF(T)}$ to generate a torque-control signal $V_{COM(T)}$. The torque-feedback loop further comprises a second filter capacitor 61 and a second compensation capacitor 65. The second filter capacitor 61 is coupled to an output of the torque synthesizer 200 to filter noise on the torque-feedback signal $V_{FB(T)}$. The second compensation capacitor 65 is coupled to an output terminal of the second error amplifier 60 to provide frequency compensation for the torque-feedback loop.

The control circuit 10 further comprises a PWM circuit 300. The PWM circuit 300 generates the PWM signal $S_{PWM}$ for driving the BLDC motor 30 in response to the speed-control signal $V_{COM(S)}$ and/or the torque-control signal $V_{COM(T)}$. The switching signals $H_X$, $L_X$, $H_Y$, $L_Y$, $H_Z$, and $L_Z$ output by the sequencer 20 are coupled to drive the BLDC motor 30 via the driving circuit 25. The pulse width of the switching signals $H_X$, $L_X$, $H_Y$, $L_Y$, $H_Z$, and $L_Z$ is determined by the pulse width of the PWM signal $S_{PWM}$. Both the speed-feedback signal $V_{FB(S)}$ and the torque-feedback signal $V_{FB(T)}$ are analog signals. The pulse width of the PWM signal $S_{PWM}$ is correlated to the level of the speed-control signal $V_{COM(S)}$ and/or the level of the torque-control signal $V_{COM(T)}$.

FIG. 2 shows an embodiment of a six-step-commutation truth table according to the present invention. In each commutation, the high-side switching signals $H_X$, $H_Y$, and $H_Z$, the low-side switching signals $L_X$, $L_Y$, and $L_Z$, and the sampling signals $S_A$, $S_B$, and $S_C$ are generated in response to the speed-output signals $H_A$, $H_B$, and $H_C$.

Figure 3:
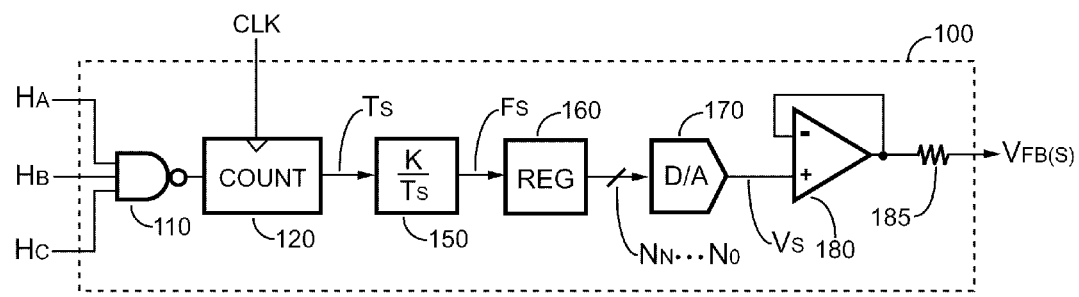
FIG. 3 shows an embodiment of a speed synthesizer of a control circuit according to the present invention.

FIG. 3 shows an embodiment of the speed synthesizer 100 according to the present invention. The speed synthesizer 100 comprises an NAND gate 110, a counter 120, a divider circuit 150, a register 160, a digital-to-analog converter 170, a buffer 180, and a first filter resistor 185. The counter 120 is driven by a clock signal CLK. The counter 120 is further coupled to receive the speed-output signals $H_A$, $H_B$, $H_C$ via the NAND gate 110 for generating a period signal $T_S$. The period signal $T_S$ is smaller in high-speed application and is greater in low-speed application. The divider circuit 150 generates a frequency signal $F_S$ in response the period signal $T_S$. Both the period signal $T_S$ and the frequency signal $F_S$ are digital signals. Equation (1) shows an equation performed by the divider circuit 150.

$$F_S = \frac{K}{T_S} \qquad (1)$$

where $F_S$ is the frequency signal; $T_S$ is the period signal; and K is a variable gain of the divider circuit 150. Since the period signal $T_S$ dramatically varies among high-speed and low-speed applications, in order to keep the speed-feedback signal $V_{FB(S)}$ among different speed applications between a fixed scaling interval, such as 0 volt~5 volt, the variable gain K is selected to be lower for high-speed application and the variable gain K is selected to be higher for low-speed application.

The frequency signal $F_S$ is stored in the register 160 in a digital form, such as $N_N \ldots N_0$. The digital-to-analog converter 170 is coupled to receive the frequency signal $F_S$ for generating a speed voltage $V_S$. The buffer 180 amplifies the speed voltage $V_S$ to generate the speed-feedback signal $V_{FB(S)}$ via a first filter formed by the first filter resistor 185 and the first filter capacitor 51.

Figure 4:
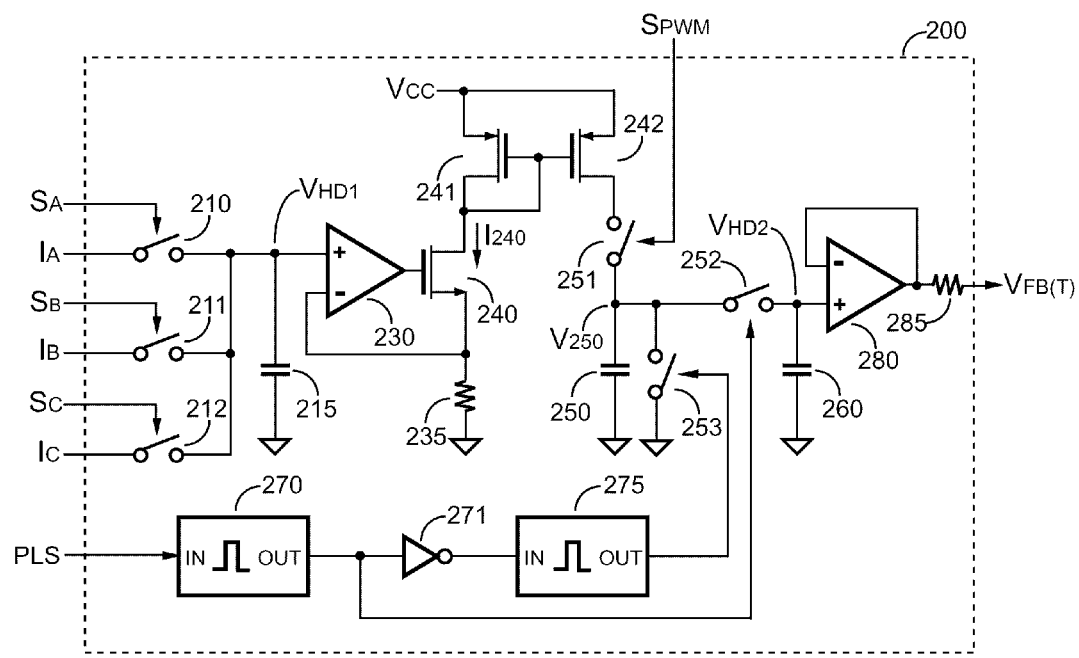
FIG. 4 shows an embodiment of a torque synthesizer of the control circuit according to the present invention.

FIG. 4 shows an embodiment of the torque synthesizer 200 according to the present invention. The torque synthesizer 200 comprises a sampling circuit, an integration circuit, a buffer 280, and a second filter resistor 285. The sampling circuit comprises a first sampling switch 210, a second sampling switch 211, and a third sampling switch 212, a first hold capacitor 215, and a V-to-I converter. A first terminal of the first sampling switch 210 is supplied with the switching-current signal $I_A$. A first terminal of the second sampling switch 211 is supplied with the switching-current signal $I_B$. A first terminal of the third sampling switch 212 is supplied with the switching-current signal $I_C$. The first sampling switch 210, the second sampling switch 211 and the third sampling switch 212 are respectively controlled by the sampling signals $S_A$, $S_B$, and $S_C$. A second terminal of the first sampling switch 210, a second terminal of the second sampling switch 211, a second terminal of the third sampling switch 212, a first terminal of the first hold capacitor 215 are connected to an input terminal of the V-to-I converter. A second terminal of the first hold capacitor 215 is connected to a ground reference. The V-to-I converter comprises an error amplifier 230, a transistor 240, a resistor 235, and a current mirror. A positive terminal of the error amplifier 230 is also the input terminal of the V-to-I converter. A negative terminal of the error amplifier 230 is connected to a source of the transistor 240. The resistor 235 is connected between the source of the transistor 240 and the ground reference. An output terminal of the error amplifier 230 is connected to a gate of the transistor 240. A drain of the transistor 240 is connected to an input terminal of the current mirror. The current mirror is composed of transistors 241 and 242 which are both supplied with a supply voltage $V_{CC}$.

The integration circuit comprises a first switch 251, an integration capacitor 250, a second switch 252, a third switch 253, a second hold capacitor 260, and a trigger circuit. A first terminal of a first switch 251 is connected to an output terminal of the current mirror. The integration capacitor 250 is connected between a second terminal of the first switch 251 and the ground reference. The third switch 253 is connected in parallel with the integration capacitor 250. A first terminal of the second switch 252 is connected to the second terminal of the first switch 251. The trigger circuit comprises one-shot circuits 270 and 275 and an inverter 271. The pulse signal PLS is supplied to an input terminal of the one-shot circuit 270. The inverter 271 is connected between an output terminal of the ones-shot circuit 270 and an input terminal of the one-shot circuit 275. The output terminal of the one-shot circuit 270 generates a hold signal to control the second switch 252. An output terminal of the one-shot circuit 275 generates a discharge signal to control the third switch 253. The second hold capacitor 260 is connected between a second terminal of the second switch 252 and the ground reference. An input terminal of the buffer 280 is connected to the second terminal of the second switch 252. An output terminal of the buffer 280 generates the torque-feedback signal $V_{FB(T)}$ via a second filter formed by the second filter resistor 285 and the second filter capacitor 61.

The sampling circuit samples the switching-current signals $I_A$, $I_B$, and $I_C$ for generating a first hold voltage $V_{HD1}$ across the first hold capacitor 215. The V-to-I converter converts the first hold voltage $V_{HD1}$ into a current signal $I_{240}$ flowing through the transistor 240. The current signal $I_{240}$ is mirrored via the current mirror to charge the integration capacitor 250 when the PWM signal $S_{PWM}$ turns on the first switch 251. An integration voltage $V_{250}$ is therefore obtained across the integration capacitor 250. As the pulse signal PLS becomes logic-high, the output terminal of the one-shot circuit 270 will generate the hold signal to turn on the second switch 252. The integration voltage $V_{250}$ will be conducted to form a second hold voltage $V_{HD2}$ across the second hold capacitor 260. The buffer 280 amplifies the second hold voltage $V_{HD2}$ to generate the torque-feedback signal $V_{FB(T)}$ via the second filter. Therefore, the torque-feedback signal $V_{FB(T)}$ is correlated to the switching currents of the BLDC motor 30.

Figure 5:
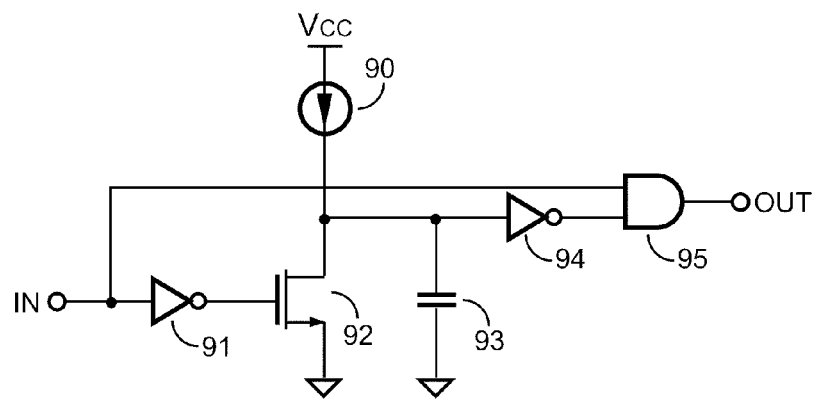
FIG. 5 shows an embodiment of a one-shot circuit according to the present invention.

FIG. 5 shows an embodiment of the one-shot circuits, such as 270 and 275 in FIG. 3, according to the present invention. The one-shot circuit comprises inverters 91 and 94, a current source 90, a transistor 92, a capacitor 93, and an AND gate 95. An input terminal IN of the one-shot circuit is coupled to a gate of the transistor 92 via the inverter 91. The input terminal IN of the one-shot circuit is also coupled to an input terminal of the AND gate 95. The current source 90 is coupled between the supply voltage $V_{CC}$ and a drain of the transistor 92. A source of the transistor 92 is connected to the ground reference. The capacitor 93 is connected between the drain of the transistor 92 and the ground reference. The inverter 94 is coupled between the drain of the transistor 92 and another input terminal of the AND gate 95. An output terminal of the AND gate 95 is coupled to an output terminal OUT of the one-shot circuit. As the input terminal IN of the one-shot circuit becomes logic-high, the output terminal OUT of the one-shot circuit will generate a short logic-high pulse whose width is determined by the current amplitude of the current source 90 and the capacitance of the capacitor 93.

Figure 6:
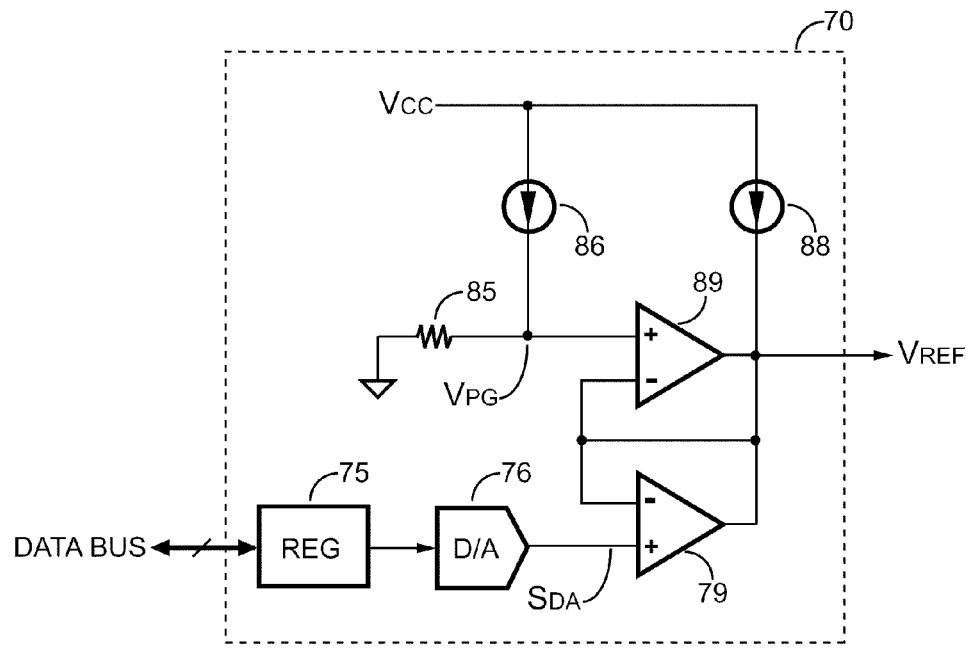
FIG. 6 shows an embodiment of a programmable signal generator according to the present invention.

FIG. 6 shows an embodiment of a programmable signal generator 70 according to the present invention. The programmable signal generator 70 embodies the first programmable signal generator 70a and the second programmable signal generator 70b to respectively generate the speed-reference signal $V_{REF(S)}$ and the torque-reference signal $V_{REF(T)}$. The programmable signal generator 70 comprises a register 75, a digital-to-analog converter 76, current sources 86 and 88, operational amplifiers 79 and 89, and a resistor 85. The current source 86 and the resistor 85 generate a programmable signal $V_{PG}$. A register 75 receives data from the interface DATA BUS which is coupled to, for example, microprocessors. The digital-to-analog converter 76 generates an analog signal $S_{DA}$ in response to an output of the register 75. The programmable signal $V_{PG}$ is supplied to a positive terminal of the operational amplifier 89. The analog signal $S_{DA}$ is supplied to a positive terminal of the operational amplifier 79. A negative terminal of the operational amplifier 89 is connected to a negative terminal of the operational amplifier 79. The output terminals of operational amplifiers 79 and 89 are open-drain type and are both connected to the negative terminals of operational amplifiers 79 and 89. The current source 88 is coupled to the output terminals of operational amplifiers 79 and 89 to pull high a reference signal $V_{REF}$ generated at the output terminals of operational amplifiers 79 and 89. The reference signal $V_{REF}$ varies in response to the amplitude of the analog signal $S_{DA}$ when the amplitude of the analog signal $S_{DA}$ is lower than that of the programmable signal $V_{PG}$. Once the amplitude of the analog signal $S_{DA}$ exceeds that of the programmable signal $V_{PG}$, the reference signal $V_{REF}$ will be equal to the amplitude of the programmable signal $V_{PG}$. Therefore, the programmable signal $V_{PG}$ determines a maximum magnitude of the analog signal $S_{DA}$.

Figure 7:
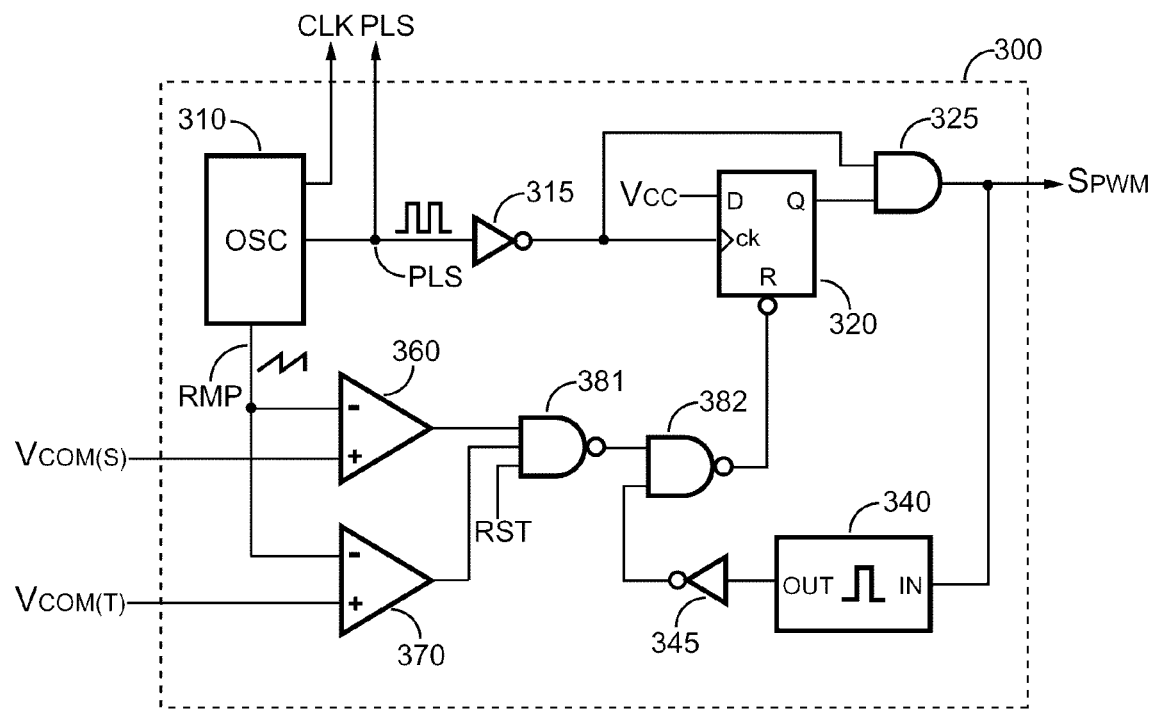
FIG. 7 shows an embodiment of a PWM circuit of the control circuit according to the present invention.

FIG. 7 shows an embodiment of the PWM circuit 300 according to the present invention. The PWM circuit 300 comprises an oscillator 310, comparators 360 and 370, inverters 315 and 345, NAND gate 381 and 382, flip-flop 320, AND gate 325, and a one-shot circuit 340. The oscillator 310 generates the clock signal CLK, the pulse signal PLS, and a ramp signal RMP. The clock signal CLK is supplied to the speed synthesizer 100. The pulse signal PLS is supplied to the torque synthesizer 200. The frequency of the clock signal CLK is higher than that of the pulse signal PLS. The pulse signal PLS enables the flip-flop 320 via the inverter 315. A first input terminal of the AND gate 325 is connected to an output terminal of the inverter 315. A second input terminal of the AND gate 325 is coupled to an output terminal of the flip-flop 320. An output terminal of the AND gate 325 generates the PWM signal $S_{PWM}$. The ramp signal RMP is supplied to negative terminals of the comparators 360 and 370. The speed-control signal $V_{COM(S)}$ is supplied to a positive terminal of the comparator 360 to be compared with the ramp signal RMP. The torque-control signal $V_{COM(T)}$ is supplied to a positive terminal of the comparator 370 to be compared with the ramp signal RMP as well. Three input terminals of the NAND gate 381 are respectively connected to an output terminal of the comparator 360, an output terminal of the comparator 370, and a reset signal RST. The reset signal RST can be internally generated by protection circuits or externally provided to free the BLDC motor 30. The comparators 360 and 370 are coupled to disable the PWM signal $S_{PWM}$ via the NAND gates 381 and 382. An input terminal of the one-shot circuit 340 is supplied with the PWM signal $S_{PWM}$. An output terminal of the one-shot circuit 340 is coupled to disable the PWM signal $S_{PWM}$ via the inverter 345 and the NAND gate 382. The one-shot circuit 340 and the inverter 345 produce a blanking time to disable the PWM signal $S_{PWM}$. The blanking time provides a minimum on-time for the PWM signal $S_{PWM}$ once the PWM signal $S_{PWM}$ is enabled. As FIG. 7 shows, the lower signal among the speed-control signal $V_{COM(S)}$ and the torque-control signal $V_{COM(T)}$ determines the pulse width of the PWM signal $S_{PWM}$.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A control circuit for controlling a BLDC (brushless direct current) motor, comprising:
   a speed synthesizer, coupled to said BLDC motor for generating a speed-feedback signal in response to a plurality of speed-output signals of said BLDC motor;
   a torque synthesizer, coupled to said BLDC motor for generating a torque-feedback signal in response to a plurality of switching-current signals, wherein said switching-current signals are correlated to switching currents of said BLDC motor;
   a first programmable signal generator, generating a speed-reference signal;
   a second programmable signal generator, generating a torque-reference signal;
   a first error amplifier, coupled to receive said speed-feedback signal and said speed-reference signal for developing a speed-feedback loop and generating a speed-control signal;
   a second error amplifier, coupled to receive said torque-feedback signal and said torque-reference signal for developing a torque-feedback loop and generating a torque-control signal; and
   a PWM circuit, generating a PWM signal to drive said BLDC motor in response to said speed-control signal and/or said torque-control signal;
   wherein said speed-feedback signal and said torque-feedback signal are analog signals; and
   wherein a pulse width of said PWM signal is correlated to the level of said speed-control signal and/or the level of said torque-control signal.

2. The control circuit as claimed in claim 1, wherein the lower signal among said speed-control signal and said torque-control signal determines said pulse width of said PWM signal.

3. The control circuit as claimed in claim 1 further comprising:
   a first compensation capacitor, coupled to an output terminal of said first error amplifier to provide frequency compensation for said speed-feedback loop; and
   a second compensation capacitor, coupled to an output terminal of said second error amplifier to provide frequency compensation for said torque-feedback loop.

4. The control circuit as claimed in claim 1 further comprising:
   a first filter capacitor, coupled to an output of said speed synthesizer for filtering noise on said speed-feedback signal; and
   a second filter capacitor, coupled to an output of said torque synthesizer for filtering noise on said torque-feedback signal.

5. The control circuit as claimed in claim 1, wherein said first programmable signal generator comprises:
   a first current source and a first resistor, generating a first programmable signal; and
   a first digital-to-analog converter, generating a first analog signal, wherein said first analog signal is programmed by data provided by an interface;
   wherein said speed-reference signal is generated in response to said first programmable signal and said first analog signal.

6. The control circuit as claimed in claim 1, wherein said second programmable signal generator comprises:
   a second current source and a second resistor, generating a second programmable signal; and
   a second digital-to-analog converter, generating a second analog signal, wherein said second analog signal is programmed by data provided by an interface;
   wherein said torque-reference signal is generated in response to said second programmable signal and said second analog signal.

7. The control circuit as claimed in claim 1, wherein said speed synthesizer comprises:
   a counter, coupled to receive said speed-output signals of said BLDC motor for generating a period signal;
   a divider circuit, generating a frequency signal by dividing said period signal with a variable gain, wherein said variable gain is varied in proportion to said period signal; and
   a digital-to-analog converter, coupled to receive said frequency signal for generating said speed-feedback signal;
   wherein said period signal and said frequency signal are digital signals, and said speed-feedback signal is an analog signal.

8. The control circuit as claimed in claim 1, wherein said torque synthesizer comprises:
   a sampling circuit, coupled to sample said switching-current signals of said BLDC motor for generating a current signal; and
   an integration circuit, generating said torque-feedback signal by integrating said current signal; wherein said torque-feedback signal is correlated to said switching currents of said BLDC motor.

9. A method for controlling a BLDC (brushless direct current) motor, comprising:
   generating a speed-feedback signal in response to a plurality of speed-output signals of said BLDC motor;
   generating a torque-feedback signal in response to a plurality of switching-current signals which are correlated to switching currents of said BLDC motor;
   generating a speed-reference signal and a torque-reference signal;
   developing a speed-feedback loop to generate a speed-control signal by amplifying an error between said speed-feedback signal and said speed-reference signal;
   developing a torque-feedback loop to generate a torque-control signal by amplifying an error between said torque-feedback signal and said torque-reference signal; and
   generating a PWM signal to drive said BLDC motor in response to said speed-control signal and/or said torque-control signal;
   wherein a pulse width of said PWM signal is correlated to the level of said speed-control signal and/or the level of said torque-control signal.

10. The method as claimed in claim 9, wherein the lower signal among said speed-control signal and said torque-control signal determines said pulse width of said PWM signal.

11. The method as claimed in claim 9 further comprising:
compensating said speed-feedback loop by connecting a first compensation capacitor to said speed feedback loop; and
compensating said torque-feedback loop by connecting a second compensation capacitor to said torque-feedback loop.

12. The method as claimed in claim 9, wherein said speed-reference signal is generated by a first current source and a first resistor.

13. The method as claimed in claim 9, wherein said speed-reference signal is generated by a first digital-to-analog converter.

14. The method as claimed in claim 9, wherein said torque-reference signal is generated by a second current source and a second resistor.

15. The method as claimed in claim 9, wherein said torque-reference signal is generated by a second digital-to-analog converter.

16. The method as claimed in claim 9, wherein said speed-reference signal and said torque-reference signal are generated in response to data provided by an interface.

17. The method as claimed in claim 16, wherein said interface is a parallel data bus.

18. The method as claimed in claim 16, wherein said interface is a serial data bus.

* * * * *